United States Patent [19]

Nyman et al.

[11] Patent Number: 5,779,997
[45] Date of Patent: Jul. 14, 1998

[54] METHOD FOR PREVENTING THE FORMATION OF JAROSITE AND AMMONIUM AND ALKALI BASED DOUBLE SALTS IN SOLVENT EXTRACTION CIRCUITS CONNECTED TO ACIDIC LEACHING PROCESSES

[75] Inventors: Bror Göran Nyman, Ulvila; Stig-Erik Hultholm, Pori, both of Finland

[73] Assignee: Outokumpu Harjavalta Metals Oy, Harjavalta, Finland

[21] Appl. No.: 440,077

[22] Filed: May 12, 1995

Related U.S. Application Data

[63] Continuation-in-part of Ser. No. 76,243, Jun. 11, 1993, abandoned.

[30] Foreign Application Priority Data

Jun. 8, 1992 [FI] Finland ................... 922842

[51] Int. Cl.$^6$ .................. B01D 11/00; C22B 23/00
[52] U.S. Cl. .................................... 423/139
[58] Field of Search ................ 423/139; 205/594

[56] References Cited

U.S. PATENT DOCUMENTS

| | | | |
|---|---|---|---|
| 4,004,990 | 1/1977 | Suetsuna et al. | 423/139 |
| 4,011,297 | 3/1977 | Nyman et al. | 423/139 |
| 4,108,958 | 8/1978 | Kok et al. | 423/139 |
| 4,196,076 | 4/1980 | Fujimoto et al. | 423/139 |
| 4,242,314 | 12/1980 | Motoba et al. | 423/139 |
| 4,246,240 | 1/1981 | Ogata et al. | 423/139 |
| 4,353,883 | 10/1982 | Rickelton et al. | 423/139 |
| 4,600,435 | 7/1986 | Wiegers et al. | 423/139 |
| 4,671,821 | 6/1987 | Lyman | 423/139 |
| 4,721,605 | 1/1988 | Brown et al. | 423/139 |
| 4,900,522 | 2/1990 | Chou et al. | 423/139 |

*Primary Examiner*—Steven Bos
*Attorney, Agent, or Firm*—McAulay Fisher Nissen Goldberg & Kiel, LLP

[57] ABSTRACT

A method for preventing the formation of jarosite, ammonium and alkali metal double salts during solvent extraction and leaching of an acidic leaching process in which an aqueous solution containing at least two metals are separated selectively from each other, and ammonium and alkali salts in the solution are neutralized prior to separation of the metals from the solution, and the formation of harmful double salts are prevented by using an exchange ion, which includes separating a first metal of the at least two metals by solvent extraction after neutralizing the solvent extraction solution by means of ammonium or alkali base; contacting the extraction solution with an aqueous solution containing an exchange ion, and replacing the ammonium or alkali ions contained in the extraction solution with the metal exchange ion during a pre-extraction step, whereby the ammonium or alkali ions are transferred into the aqueous solution to prevent formation of ammonium and alkali based double salts in a leach process solution.

4 Claims, 2 Drawing Sheets

METHOD FOR PREVENTING THE FORMATION OF JAROSITE AND AMMONIUM AND ALKALI BASED DOUBLE SALTS IN SOLVENT EXTRACTION CIRCUITS CONNECTED TO ACIDIC LEACHING PROCESSES

This application is a continuation-in-part of Ser. No. 08/076,243, filed Jun. 11, 1993, now abandoned.

BACKGROUND OF THE INVENTION

1. Field of the Invention

The invention relates to a method for preventing the formation of jarosite and ammonium and alkali based double salts in the solvent extraction of an acidic leaching processes, whereby desired metals are separated according to an order of importance of the metal for later use in a selected order.

In the method an organic extraction solution used in the acidic leaching process is neutralized by ammonium or alkali bases prior to the separation of the more desired metals from other, possibly, less desirable metals in order to improve the extraction recovery. In a pre-extraction step after neutralization, the extractant or extraction solution, containing the metals which are to be separated or extracted from each other, is contacted with an aqueous solution containing a metal which, in this pre-extraction step, replaces the ammonium or alkali ions contained in the extraction solution. Thus the ammonium or alkali ions are removed from the extraction solution prior to the separation of the desired metals in the main solvent extraction stages.

2. Description of the Prior Art

The treatment of iron is an important factor when processing metallurgical concentrates and ores. Particularly in leaching processes and cases where the treatment is based on the combination of leaching and smelting, the behavior of iron is extremely important. One of the characteristics of iron is that in its trivalent state, it forms alkali double salts, with a composition $D[Fe_3(SO_4)_2(OH)_6]$. In these so-called jarosite compounds, D is an alkali metal such as sodium or potassium, or it may also be ammonium. Jarosite compounds are formed from acidic solutions containing trivalent iron and ammonium, sodium or potassium. Jarosite is mainly formed within the pH region 0.5–5.0 of the acidic solution. An increase in temperature supports this formation. Jarosite is readily formed in the region 60°–220° C. The higher the temperature, the lower the pH of the solution where jarosite is formed.

In leaching-based zinc processes it is normal to utilize the jarosite formation in removing iron from zinc-bearing solutions.

The present invention in turn relates to processes in which the formation of jarosite or other ammonium or alkali double salts should be avoided. One of these processes is the production process of either nickel, cobalt or copper. The raw material can be an ore, a concentrate or an intermediate product obtained from the smelting of a concentrate or other similar metal bearing material.

The process in question includes processing steps carried out at temperatures above ambient. These steps are atmospheric or pressurized leaching steps taking place at over 60° C. and with solutions containing 0.5–85% iron. Within the scope of the process steps, there is also the removal of iron from process solutions obtained from the leaching steps, when the applied method is a normal hydrolysis carried out within a temperature range of 60°–220° C.

In the above mentioned cases, the formation of jarosite cannot be avoided when the process in question requires an addition of ammonium or alkali bearing materials. Such materials are needed for the adjustment of the pH value of the solutions. They are also needed in intensifying solution cleaning which takes place at a higher pH value than leaching and iron removal. For example in the nickel process, the purpose is mainly to remove zinc, copper and cobalt. In cases like this, ammonium double salts, such as ammonium nickel sulfate, can crystallize and cause problems in the solvent extraction and leaching stages of the leach process.

Earlier the creation of jarosite and double salts was not as problematic as today. The increased demands for environmental protection represent a factor which nowadays restricts the processes. When using ammonia for neutralization, the creation of ammonium jarosite causes nitrogen emissions, in the form of $NO_x$ development, for instance in a process of the type illustrated in FIG. 1. In the process conditions used, the formation of jarosite cannot be prevented in the leaching and iron removal steps. The inevitable result is that the leach residue contains jarosite.

The jarosite is decomposed, consuming energy, in the next further processing step, which in this case is smelting. Thus the formation of jarosite lowers the cost efficiency. In a similar manner, the iron precipitate consumes energy in the smelting treatment, although on the other hand, the smelting treatment binds the iron to the inert slag to an excellent degree, and at the same time eliminates problems related to the storage of finely divided iron precipitates. Alkali metals in turn are traditionally non-desirable materials in smelting.

SUMMARY OF THE INVENTION

The present invention relates to a method for avoiding the formation of jarosite or ammonium and alkali based double salts during solvent extraction and leaching by preventing the access of ammonium, sodium or potassium to the circulating solution, even if ammonium or sodium is used for boosting the solution cleaning. The extraction solution obtained from the circulation of the extraction process is neutralized by an ammonium or alkali salt, but the access of the ions into the main extraction circuit, where the desired metals are separated, is prevented by using a pre-extraction step, in which the ammonium or alkali ions are transferred into an aqueous solution, and they are replaced in the extraction solution by an exchange ion. It is essential that of the desired metals to be separated in the solvent extraction step, at least one desired metal is selectively extracted before the exchange ion. When the ammonium and alkali ions are removed from the solution, a higher temperature can be used for intensifying the leaching, and smelting can be applied as a natural further processing step for recovering one of the metals to be separated and for improving environmental protection. The essential novel features of the invention are apparent from the appended patent claims.

BRIEF DESCRIPTION OF THE DRAWING

The invention is further illustrated with reference to the appended drawings, in which.

DESCRIPTION OF THE PREFERRED EMBODIMENTS

Figure 1:
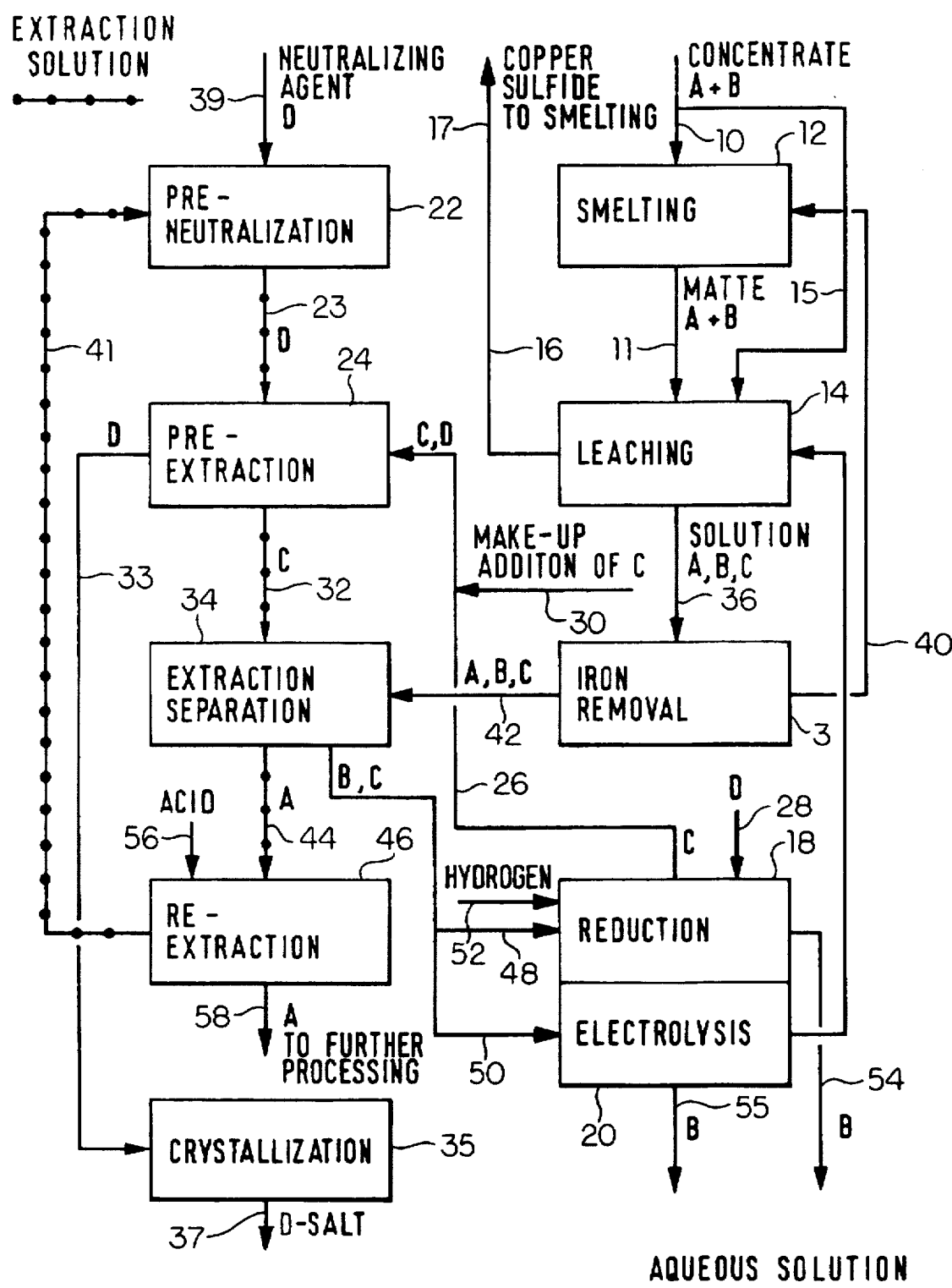
FIG. 1 is a flowchart of a preferred embodiment of the invention.

When using the method of the invention, certain process technical advantages are also achieved. When a neutral salt, such as ammonium, sodium or potassium sulfate, is not accumulated in the solution circulation, the solubility of, for instance, nickel sulfate is increased. This can be utilized for raising the capacity of the reduction and electrolysis steps included in the process. Among other advantages, let us point out that thickening, filtering and electrolysis all become easier. A high metal content also improves the quality of the metal produced. Another specific advantage is that it is not necessary to introduce a separate removal of neutral salt from the main process solutions, for instance by crystallization.

The invention can be broadly described by using reference letters, such as A, B, C and D to indicate the order of selective extraction with the letter A representing the first metal which is selectively chosen as the first metal to be extracted from the solution and the other metals extracted in an order related to the pH of the solution from which it is extracted. It is advantageous but not necessary that metal C is selectively extracted in preference to metal B, so that it helps the selective extraction of metal A in relation to the metal B. For the sake of explanation and for ease of explanation, letters are being used. In addition to a designation of the metals by alphabetical letters, specific metals will be referred to for purposes of explanation. Also during a recrystallization stage, a D-salt is removed with the recrystallization of ammonium sulfate.

It should be further noted that the letter A can represent two or more metals which are extracted as co-extractants. In this respect, it should also be noted that more than two metals can be extracted as co-extractants and be considered as identified by the letter A.

An example of co-extractants, when the metals iron and zinc are to be extracted, these two metals can be considered to be co-extractants A, with other metals represented by the letters B and C.

As another example of co-extracting when using magnesium as metal C and nickel as metal B, then the following group of metals can be considered as co-extractants: iron, zinc, manganese, copper, cadmium and cobalt and these as a group represent the first metal or first group of metals which are to be extracted as co-extractants. While cobalt has generally been designated as metal A for order of extraction, the other metals are co-extracted.

For purposes of explanation and short-hand explanation as noted, letters are being used. When viewing FIG. 2, it will become apparent that different metals can be designated with the letter A depending on which metal is to be selectively extracted.

According to the present invention, a process including smelting steps, leaching and recovering of two desired metals, such as cobalt and nickel, which are selected as the desired metals and which will also be respectively referred to as metal A and metal B, by means of reduction and/or electrolysis is further complemented by characteristic extraction process steps complemented with crystallization. Hereinafter, for purposes of explanation cobalt will be referred to as metal A and nickel will be referred to as metal B. Another metal C, such as magnesium and referred to for purposes of explanation as metal C also is utilized in the process, which metal does not necessarily have to be a desired metal. From the recovery of nickel, selected metal B, for instance from the reduction, there is conducted a metal C-bearing solution containing magnesium to the pre-extraction, and the magnesium or metal C-content of the solution is continuously increased to a degree that compensates the losses. The employed neutralizing agent is a substance D, which is an ammonium, sodium or a potassium salt or an alkali salt. In the pre-extraction, there follows a mixing contact with the extraction solution neutralized with the neutralizing agent D, such as an ammonium, sodium or potassium salt.

In FIG. 1, the single continuous line between stages designates an aqueous solution, and a line having a round bullet periodically designates an extraction solution.

As can be seen from FIG. 1, a concentrate or a solid substance 10 containing metals A and B in an aqueous solution as shown by the single continuous line is applied to a smelting stage 12, a matte 11 containing metals A and B is withdrawn from the smelting stage and supplied to a leaching stage 14. In addition, part of the original concentrate 15 of the aqueous solution containing metals A and B is also supplied to leaching stage 14. For purpose of explanation to refer to the metals specifically, metal A is cobalt and metal B is nickel, and metal C is magnesium. A cobalt, nickel and magnesium bearing solution 36 is withdrawn from the leaching stage 14 and applied to the iron removal stage 38, and copper sulfide 16 is also withdrawn from the leaching stage 14 and supplied to smelting 17. A leaching residue 40 is removed from the iron removal stage 38 and is supplied to the smelting stage 12 as will be explained, after the solution 36 of metals A, B, C is supplied to an iron removal stage 38 from the leaching stage 14, and a metal C derived from reduction stage 18 and derived from an electrolysis stage 20 is supplied through line 19 to leaching stage 14 after reduction and electrolysis from which metal B is recovered.

It should be noted that metal B can be recovered either by reduction or by electrolysis or by both reduction and by electrolysis. Specifically, metal B is recovered from reduction stage 18 through line 54 and from electrolysis stage 20 through line 55.

A neutralizing agent D, (an ammonium or an alkali salt) is supplied through line 26 to pre-extraction stage 24, and the neutralizing agent D is also supplied through line 39 in an aqueous solution to a pre-neutralization stage 22. An extraction solution from stage 22 containing the neutralizing agent D is supplied through line 23 in the extraction solution to pre-extraction stage 24. Also, supplied to pre-extraction stage 24 is metal C and neutralizing agent D which follows with the aqueous solution when it is led from the reduction stage 18 to the pre-extraction stage 24, supplied through line 26. Neutralizing agent D is supplied through line 28 to reduction stage 18. Should additional metal C be required, then make up addition of metal C is supplied from line 30 through line 26 to the pre-extraction stage 24 to compensate for losses of metal C.

From pre-extraction stage 24, an extraction solution containing metal C is supplied through line 32, as shown as a line having a plurality of round bullets periodically therealong, to extraction and separation stage 34, which is the main extraction stage. As noted, heretofore, the aqueous solution line is shown as the single continuous line and the extraction solution line is shown as the line with the bullets periodically therealong.

Also, D ions in the aqueous solution are withdrawn from pre-extraction stage 24 and supplied through line 33 to recrystallization stage 35 and D-salt is withdrawn through line 37.

From the leaching stage 14, an aqueous solution containing metals A, B, and C is supplied through line 36 to iron removal stage 38. The iron removal stage 38 supplies a leaching residue in an aqueous solution through line 40 to smelting stage 12 for recirculation. And, iron removal stage 38 also supplies an aqueous solution of metals A, B, and C through line 42 to extraction and separation stage 34.

From extraction and separation stage 34 metal A is first extracted in an extraction solution and supplied through line 44 in the extraction solution to re- extraction stage 46 and metals, B and C are supplied in the aqueous solution through line 48 to reduction stage 18 and through line 50 to electrolysis stage 20. For reduction stage 18, hydrogen is supplied through line 52 and metal B is withdrawn from the reduction stage 18 through line 54, and metal B is also withdrawn from electrolysis stage 20 through line 55.

Acid is supplied through line 56 to re-extraction stage 46 to assist in the withdrawal of metal A, and metal A is then withdrawn from re-extraction stage 46 through line 58 and can then be further processed.

In the preferred process, cobalt as noted was designated as metal A and is withdrawn from re-extraction stage 46 in the aqueous solution and supplied through line 58 for further processing.

The acid content from re-extraction stage 46 is supplied through line 41 to the pre-neutralization stage 22 with the organic extraction solution for neutralization in the pre-neutralization stage 22.

Generally the extraction solution is kerosene-based and contains an extractant which, according to its extraction equilibriums, selectively extracts metal A in preference to the exchange ion in the next extraction separation, from a solution containing cobalt, nickel and magnesium, the metals designated A, B and C, respectively, and is conducted through line 42 from the iron removal stage 38 to the extraction separation stage 34. The employed aqueous solution is advantageously a sulfate solution.

In the pre-extraction stage 24, the extraction solution supplied through line 23 containing neutralizing agent D, contacts an aqueous solution containing the metal C and neutralizing agent D supplied through line 26. An ion exchange reaction takes place, and according to the reaction, metal C is extracted and is placed into the extraction solution in line 32 exiting from pre-extraction stage 24, at the same time exchanging all D substances (neutralizing agent) and removing them from the pre-extraction solution in pre-extraction stage 24 and placing them into the aqueous phase in line 33 supplied to crystallization stage 35, which is directed out of pre-extraction in stage 24 and is removed with the D-salt through line 37.

The extraction solution from the pre-extraction stage 24 containing the metal C is conducted through line 32 to extraction separation stage 34 together with an aqueous solution containing metals A and B and metal C from iron removal stage 38 supplied through line 42 so that an ion exchange takes place between metals C and A, i.e., between magnesium and cobalt. In the extraction separation stage 34 metal C is transferred back to the aqueous phase, which phase is further fed either through line 48 or 50 and metal C returns, via the recovery of nickel B by means of reduction in the reduction stage 18 or electrolysis in the electrolysis stage 20, to pre-extraction stage 24 through line 26 for a new cycle of solvent extraction. Thus metal C serves as a type of exchange ion; first it displaces the D ion (ammonium, sodium or potassium), from the extraction solution in pre-extraction, then it goes back to the aqueous solution in the extraction separation itself. Thus, metal C is not consumed in the process, apart from small quantities along with the D ion, and the metal A, and this consumption can be compensated for with a small addition prior to the pre-extraction.

Metal A is again removed from the extraction solution by contacting with an acid supplied through line 56 to the re-extraction stage 46 to form an aqueous solution containing metal A exiting through line 58.

Our method, as is clear from the previous detailed explanation, is not bound to any special metals or extraction solutions. It is advantageous but not necessary that metal C, is selectively extracted in preference to metal B so that it helps the selective extraction of metal A in relation to the metal B. The metals are extracted according to the cation exchange with such extractants that need a neutralizer addition in order to enhance the extraction reaction. Such extractants are di-(alkyl)-phosphoric acids, monoalkyl esters of alkyl phosphoric acid and di-(alkyl)-phosphinic acids and organic carboxylic acids, generally of the type C-10, as well as a large number of other acidic organic extractant compounds.

$C_{10}$ trialkylactic acids, referred to as neodecanoic acid or as versatic 10 are liquids at room temperature. C-10 carboxylic acid is a carboxylic acid which has altogether ten carbon atoms in its molecular structure and can be classified according to the amount of carbon atoms in the molecule itself.

The following description is a typical processing method of the present invention for producing pure nickel and for recovering cobalt in connection with the solution cleaning of the process. The process is further explained with reference to the flowchart of FIG. 1. However, our method can be applied to other metals, too, as is apparent from the above specification and the examples given below.

Figure 2:
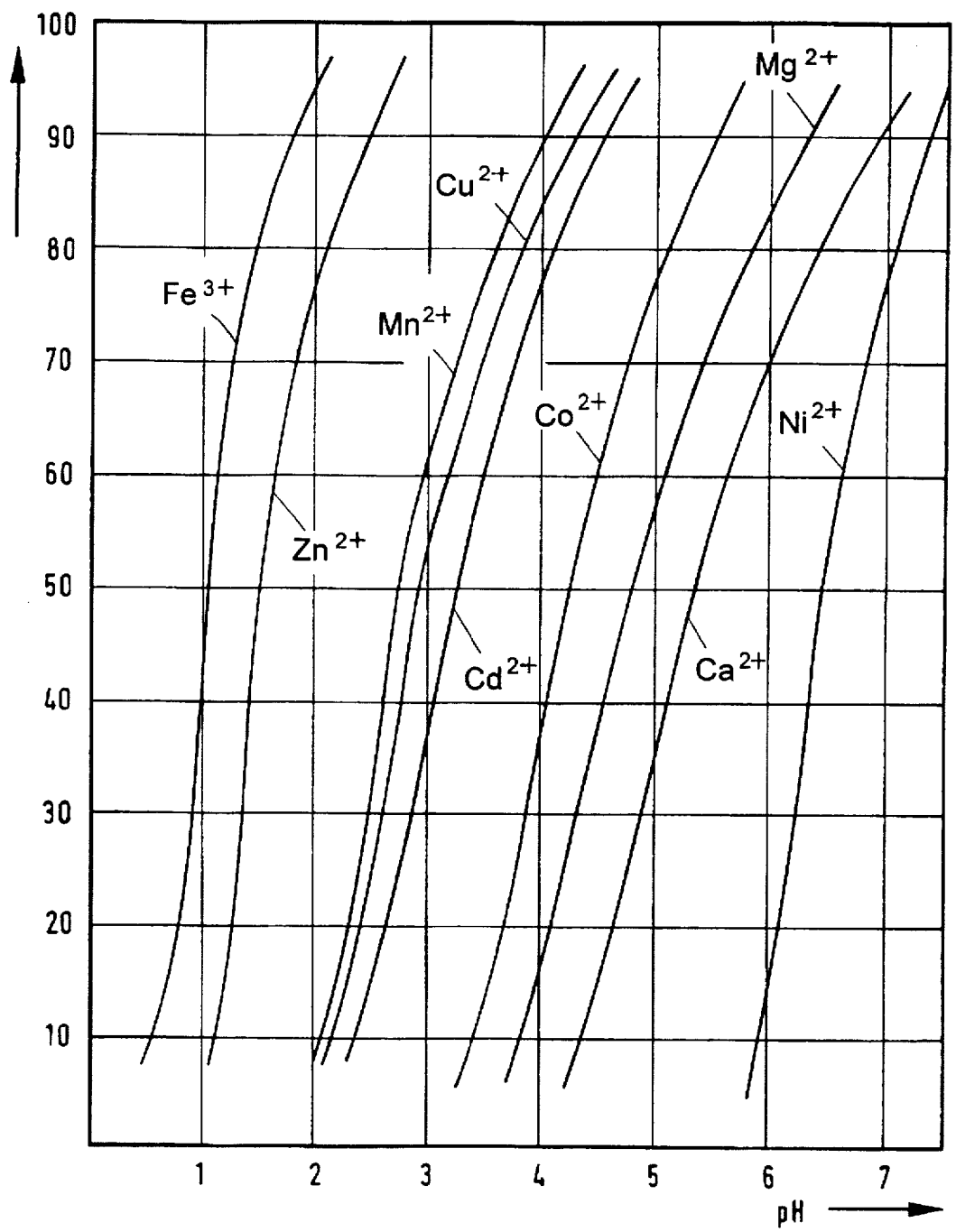
FIG. 2 illustrates the extraction of some metals as a function of the pH value of the solution from which extracted with a fixed extractant.

The organic extraction containing magnesium is conducted to the main extraction stage to contact the aqueous solution containing at least two valuable metals (cobalt and nickel). FIG. 2 shows the order of extraction of metals from an aqueous solution to the organic solution when the organic solvent extractant is CYANEX 272®.

The organic extraction solution where e.g. CYANEX 272® is the organic solvent, comes through two stages before the extraction separation stage. The first stage is pre-neutralization 22 which can also be called simply neutralization and there the acid content of the organic solvent 41 which comes from the re-extraction stage 46 must be neutralized. In the re-extraction stage 46, acid containing solution 56 is contacted with the organic extraction solution to transfer metal A into an aqueous solution in the re-extraction stage. The neutralization takes place in the pre-neutralization stage with ammonium or alkali salts D. To prevent these ammonium or alkali salts D from being present in the extraction separation, they must be exchanged in the pre-extraction stage 24 where ammonium or alkali salts of the extraction solution are substituted with magnesium by contacting the extraction solution with magnesium containing aqueous solution.

In this example, metal A is cobalt and metal B is nickel. Metal C is magnesium, and neutralizing agent D is ammonia. The nickel separation process is arranged in connection with nickel and copper smelting processes and cobalt and nickel designated as concentrate A and B are supplied through line 10 to the smelting stage 12 and a matte of metals A and B is supplied through line 11 to the leaching stage 14, where the leaching object may be a sulfidic nickel concentrate and/or matte supplied through line 11 produced in the smelting process. The copper sulfide bearing material formed as a leaching residue in leaching stage 14 is further processed in copper smelting for recovering copper and possible precious metals and supplied through line 16 to smelting 17 from leaching stage 14.

According to the method of the invention, the magnesium-bearing solution is separated by hydrogen reduction in reduction stage 18, and is conducted to the pre-extraction stage 24 through line 26 where there is also supplied through line 23 the extraction solution which is pre-neutralized with ammonia. This is composed of di-(alkyl)-phosphinic acid, which is dissolved into kerosene. The said phosphinic acid is di-(2,4,4-trimethyl-pentyl)-phosphinic acid, which according to its extraction properties is capable of separating cobalt and nickel.

In the pre-extraction stage 24, nearly all magnesium is transferred to the extraction solution, which returns an equivalent quantity of ammonium to the aqueous solution. Next the aqueous solution is conducted through line 33 to the crystallization stage for the crystallization of ammonia sulfate. This procedure ensures that ammonium, which is beneficial to the extraction, is not emitted to the nickel solution circulation. Also, the crystallization of the so-called neutral salt is avoided in the main process flow proper and D-Salt is removed through line 37.

Next the extraction solution from pre-extraction stage 24, in magnesium form, is conducted to the extraction separation stage 34, where it is contacted with an aqueous solution of cobalt-bearing nickel supplied through line 42 from iron removal stage 38. As is seen from the extraction curves of FIG. 2, the cobalt is selectively extracted in preference to magnesium with CYANEX 272®, a registered trademark. As used in the specification and as noted from FIG. 2 of the drawing, the lower the pH of the solution at which extraction takes place, the more selectively the metal element is extracted; therefor, as noted from FIG. 2, cobalt is selectively extracted in preference to magnesium, and nickel. The extraction solution is a technical di-(2,4,4-trimethyl-pentyl)-phosphinic acid product. Thus cobalt displaces magnesium from the extraction solution; as a result there is obtained a nickel solution in lines 48 and 50 cleared of cobalt and an extraction solution in line 44 concentrated with respect to cobalt. For the recovery of cobalt, the next step is the treatment of the extraction solution with the acid 56 in the re-extraction stage 46 and further treatment of the re-extraction solution exiting through line 58 which can be subjected to further processing.

As for magnesium, it does not disturb the nickel recovery in the successive electrolysis and/or reduction, but remains in the solution and can again be extracted therefrom in the pre-extraction during the next process cycle. The method of the invention to use magnesium as an exchange ion for cobalt extraction prevents the access of ammonium to the process circulation. However, the use of ammonium is necessary, because the cobalt extraction would be seriously incomplete without the use of ammonia for boosting the extraction.

We claim:

1. A method for preventing the formation of jarosite, or ammonium or alkali metal double salts during leaching and solvent extraction of nickel and cobalt, comprising:

1) neutralizing an organic extraction solution of a di-(2,4,4-trimethylpentyl)phosphinic acid with at least one of an ammonium, sodium or a potassium base;

2) conducting the neutralized organic extraction solution to a pre-extraction step, where the organic extraction solution is contacted with an aqueous solution containing magnesium exchange ions, wherein said magnesium exchange ions replace the ammonium or alkali ions in the organic extraction solution, said aqueous solution now containing said ammonium or alkali ions;

3) the aqueous solution containing said ammonium or alkali ions is crystalized to recover ammonium or alkali salt;

4) the organic extraction solution, which is now free of ammonium or alkali ions but contains magnesium ions, is then contacted with an aqueous solution containing nickel and cobalt to selectively extract cobalt into the organic extraction solution, leaving nickel in the aqueous solution;

5) recovering cobalt from the organic extraction solution; and 6) recovering nickel from the aqueous solution.

2. The method according to claim 1, wherein the nickel is recovered by one of hydrogen reduction or electrolysis.

3. The method according to claim 1, wherein the nickel and the exchange ion are recovered by hydrogen reduction.

4. The method according to claim 1, wherein the nickel is recovered by hydrogen reduction.

* * * * *